United States Patent [19]

Yano

[11] Patent Number: 4,959,998

[45] Date of Patent: Oct. 2, 1990

[54] ULTRASONIC IMAGING APPARATUS

[75] Inventor: Masahiko Yano, Ootawara, Japan

[73] Assignee: Kabushiki Kaisha Toshiba, Kawasaki, Japan

[21] Appl. No.: 394,279

[22] Filed: Aug. 14, 1989

Related U.S. Application Data

[63] Continuation of Ser. No. 275,617, Nov. 25, 1988, abandoned.

[30] Foreign Application Priority Data

Apr. 11, 1986 [JP] Japan .................................. 61-83818
May 15, 1986 [JP] Japan .................................. 61-109665

[51] Int. Cl.⁵ .......................................... G01N 29/04
[52] U.S. Cl. .................................................... 73/626
[58] Field of Search ................. 73/625, 626, 627, 628, 73/610, 620; 367/11; 128/661.01

[56] References Cited

U.S. PATENT DOCUMENTS

| | | | |
|---|---|---|---|
| 4,173,007 | 10/1979 | McKeighen et al. | 73/625 |
| 4,234,940 | 11/1980 | Iinuma | 367/105 |
| 4,267,584 | 5/1981 | McKeighen et al. | 367/11 |
| 4,603,586 | 8/1986 | Iida | 73/626 |
| 4,779,242 | 10/1988 | Lannuzel | 73/626 |

Primary Examiner—Michael J. Tokar
Assistant Examiner—Louis M. Arana
Attorney, Agent, or Firm—Finnegan, Henderson, Farabow, Garrett, and Dunner

[57] ABSTRACT

An ultrasonic imaging apparatus comprising an ultrasonic transducer, and a delay circuit section. The transducer has an array of ultrasonic transducer elements, and emits ultrasonic waves and receives echo waves to convert these waves into echo signals. The delay circuit section delays the echo signals by delay times determined by at least the directions in which the ultrasonic waves have been emitted from the transducer. This circuit has first and second memories for alternately writing and reading the echo signals, and a circuit for addressing the first and second memories by applying these memories with addresses, the number of which corresponds to the delay time.

10 Claims, 6 Drawing Sheets

FIG. 4

ULTRASONIC IMAGING APPARATUS

This application is a continuation of application Ser. No. 275,617, filed Nov, 25, 1988, now abandoned.

BACKGROUND OF THE INVENTION

The present invention relates to an ultrasonic imaging apparatus for forming a tomogram of a subject by applying ultrasonic beams to the subject and then by processing the echo waves emitted from the subject.

An ultrasonic imaging apparatus can perform linear scanning or sector scanning on a subject by using ultrasonic beams, receive the echo waves emanating from the points where the beams have been reflected, and process the echo signals obtained from the echo waves, to thereby form a tomogram of the region of interest. The apparatus has a linear array of transducer elements, and a delay circuit including delay elements coupled to the transducer elements, respectively. The echo signals are processed by the phased array method. The delay elements are indispensable for the phased array method. The delay elements have different delay times. The delay time of each delay element is the difference between the period of time which an echo wave requires to travel from the region of interest to the transducer element coupled to the delay element and the period of time which an echo signal requires to travel from the region of interest to the next transducer element. Each transducer element converts the echo signal into an electric echo signal, and supplies this signal to the corresponding delay element. The delay element delays the signal by the delay time. As a result, the delay elements provide echo signals in the same way as in the case where the echo waves are in phase when they reach the respective transducer elements.

The delay elements, which play an important role in the phased array method, are so-called LC delay lines each comprised of an inductance and a capacitance. The LC delay line has several taps. One of the taps is selected, thereby providing a desired delay time by which an echo signal will be delayed.

The LC delay line is expensive, however. This raises the cost of the delay circuit. The LC delay line is also disadvantageous in that its delay time cannot be minutely adjusted. Further, it is possible that the LC delay lines fail to have the desired delay times since the inductances and capacitances have different characteristics from one another. Another problem with the LC delay line is that noise is generated as one tap is switched to another, and this noise will inevitably enter the echo signal (an analog signal) input to the delay circuit. For instance, in order to accomplish dynamic focussing, that is, to move the point at which the ultrasonic beam is focussed, while the echo wave corresponding to this beam is being received by a transducer element, one tap must be switched to another. This tap-switching generates noise, which will unavoidably mingle with the echo signal output from the transducer element.

SUMMARY OF THE INVENTION

It is accordingly the object of the present invention to provide an ultrasonic imaging apparatus having a digital delay circuit which comprises delay elements of a substantially identical characteristic, and prevents noise from entering any input signal.

According to the invention, a plurality of digital delay circuits are used which are coupled to ultrasonic transducer elements, respectively, to receive the echo signals output by these transducer elements. Each delay circuit has first and second memories. Data is written into the first memory, while data is being read out from the second memory, and vice versa. A desired number of addresses of either memory are updated to delay the input echo signal by a desired period of time. That is, the more addresses updated, the longer delay time. Hence, the echo signal input to the delay circuit is digitally delayed. During the receiving operation in the dynamic focussing, the number of addresses of either memory are sequentially updated to move the focus point.

BRIEF DESCRIPTION OF THE DRAWINGS

FIG. 4 is a timing chart explaining the operation of the unit shown in FIG. 3;

DETAILED DESCRIPTION OF THE PREFERRED EMBODIMENTS

Figure 1:
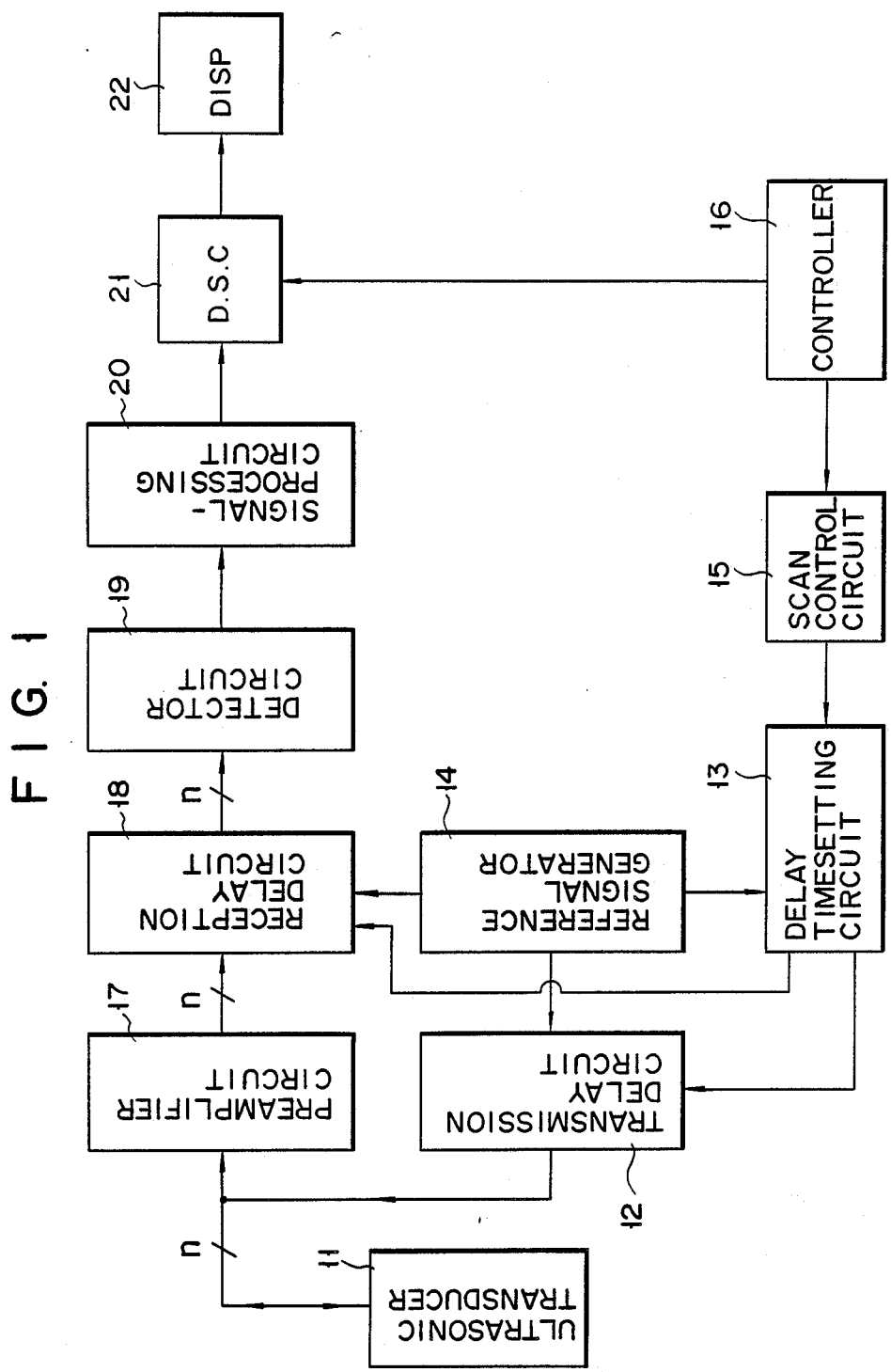
FIG. 1 is a block diagram of an ultrasonic imaging apparatus according to the present invention.

The ultrasonic imaging apparatus shown in FIG. 1, i.e., a first embodiment of the present invention, has ultrasonic transducer 11. Transducer 11 comprises a plurality of ultrasonic transducer elements (not shown) arranged in a line, provided for 1 to n channels, respectively. Ultrasonic transducer 11 is connected to transmission delay circuit 12. Delay time-setting circuit 13 and reference signal generator 14 are connected to transmission delay circuit 12. Circuit 13 is coupled to scan control circuit 15, and determines a transmission/reception delay time from the scan signal supplied from scan control circuit 15. Controller 16, which controls various components of the apparatus, is connected to scan control circuit 15.

Ultrasonic transducer 11 is connected to reception delay circuit 18 through preamplifier circuit 17 for amplifying the echo signals output by transducer 11. Reception delay circuit 18 includes a digital delay circuit, which will be described later. A delay time determined by the output signals of delay time-setting circuit 13 and reference signal generator 14 is set in reception delay circuit 18. The output of circuit 18 is coupled by detector circuit 19 to signal-processing circuit 20. Detector circuit 19 detects the echo signals supplied from reception delay circuit 18, for each of the channels. Circuit 20 performs a conventional logarithmic conversion and filtering of the signals detected by detector circuit 19. The output of signal processor circuit 20 is coupled by digital scan converter 21 to display device 22.

Reception delay circuit 18, which is the essential component of the ultrasonic imaging apparatus according to the invention, will now be described with reference to FIG. 2.

Figure 2:
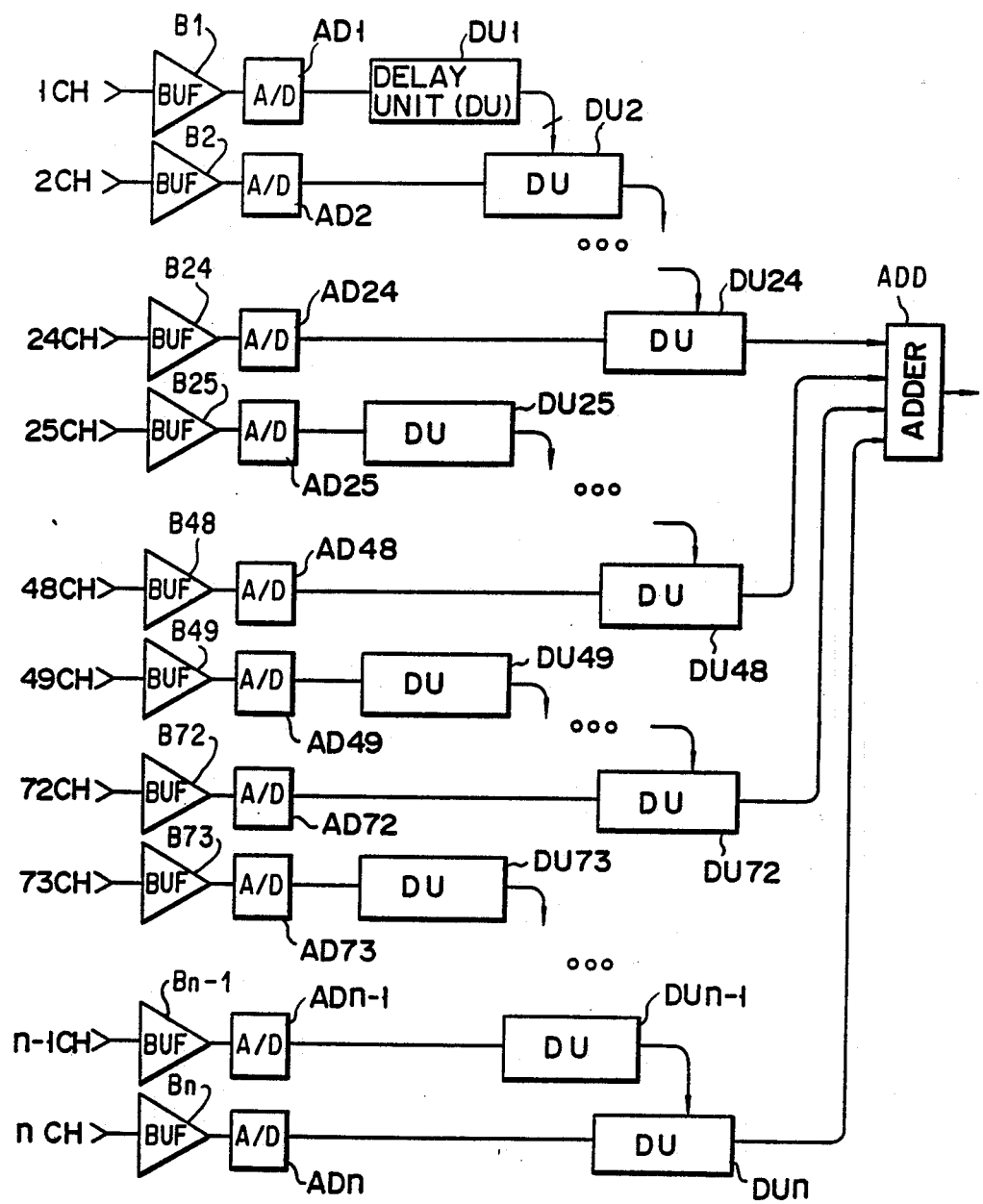
FIG. 2 is a circuit diagram of the delay circuit section used in the apparatus shown in FIG. 1.

As is shown in FIG. 2, reception delay circuit 18 comprises A/D converters AD1 to And, buffers B1 to Bn, and delay units DU1 to DUn. First to nth channel echo signals are input from preamplifier circuit 17 to A/D converters AD1 to And through buffers B1 to Bn, respectively. The output terminals of A/D converters AD1 to And are coupled to delay units DU1 to DUn. Units DU1 to DUn each include an adder. For example, four groups of delay units may be provided, each having 24 units. The first group has units DU1 to DU24 for the first to twenty-fourth channels; the second group is comprised of units DU25 to DU48 for the twenty-fifth to fourty-eighth channels; the third group is made of units DU49 to DU72 for the forty-ninth to seventy-second channels,; and the fourth group has DUn-23 to DUn for the (n−23)rd to nth channels. In the first group, the output of unit DU1 is coupled to the adder of unit DU2, the output of the unit DU2 is connected to the adder of unit DU3, the output of unit DU3 is coupled to the adder of unit DU4, and so forth. In all other groups, the delay units are connected in the same way. Therefore, in each group, the outputs of the delay units are sequentially added, thus achieving the addition of phased echo signals.

The outputs of last delay units DU24, DU48, DU72 and DUn of the four groups are coupled to adder ADD. The output of this adder ADD is the output of reception delay circuit 18 and is connected to detector circuit 19.

Since delay units DU1 to DUn of reception delay circuit 18 are divided into, for example, four groups of channels, the echo signals can be processed at high speed, and the amount of data, which the hardware should process, can be reduced to a minimum.

Figure 3:
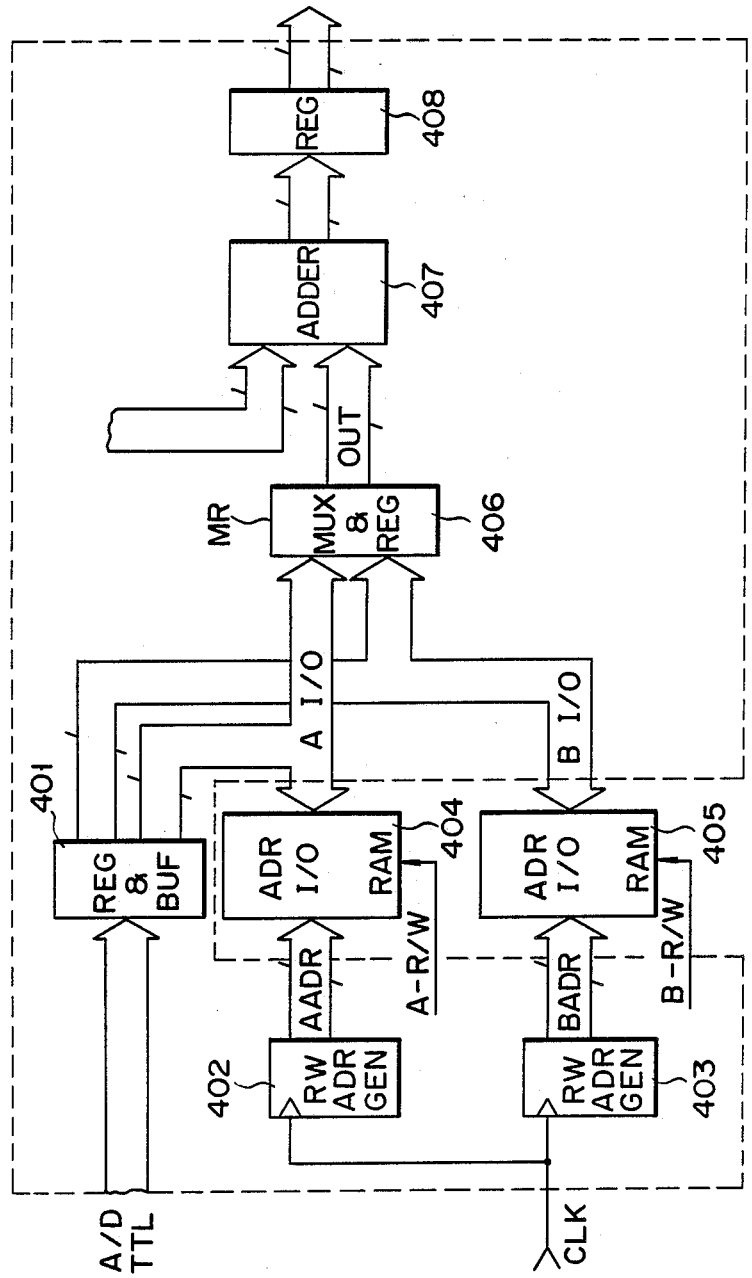
FIG. 3 is a block diagram of the delay unit provided in the delay circuit section of FIG. 2.

FIG. 3 shows the circuit configuration of each delay unit DU used in reception delay circuit 18. As is shown in this figure, the output of the corresponding A/D converter is connected to register/buffer circuit 401. Two read/write registers 402 and 403 are coupled to two static memories (RAMs) 404 and 405, respectively. RAMs 404 and 405 are accessed such that data is read out from one memory, while data is being written into the other memory. The I/0 ports of static memories 404 and 405 are coupled to register/buffer circuit 401 and also to multiplexer/register circuit 406. The output of multiplexer/register circuit 406 is coupled to adder 407. Adder 407 also receives the delay signal from another delay unit which is paired with the present delay unit. The output of adder 407 is connected to register 408. The output of register 408 is connected to the input of the adder (407) of the other delay unit paired with the present delay unit.

The operation of the delay unit shown in FIG. 3 will now be explained. The digital data output from the A/D converter, to which the delay unit is coupled, is temporarily stored in register/buffer circuit 401 and is then transferred to RAMs 404 and 405. RAMs 404 and 405 are controlled by signals A-R/W and B-R/W such that data is read from RAM 404 while data is being written into RAM 405, and vice versa. To achieve the data-reading and data-writing alternately, address generators 402 and 403 output address data in synchronism with clock signal CLK, thereby accessing RAMs 404 and 405. More specifically, when the read/write control signals A-R/W and B-R/W, both shown in FIG. 4, are supplied to RAMs 404 and 405, and addresses 3, 2, 1 and 0 are supplied from address generator 402 to RAM 404 in synchronism with clock signal CLK, pieces of input digital data, 1, 2, 3 and 4 are sequentially written into RAM 404. While these pieces of data are being written into RAM 404, data can be read from RAM 405. At the initial stage, no data is stored in RAM 405, and RAM 405 remains empty for the period of time corresponding to four clock signals CLK. This period is the delay time.

Upon writing pieces of input digital data, 1, 2, 3 and 4 into RAM 404, read/write signals A-R/W and B-R/W are inverted. As a result, RAM 404 is set into a read mode, and memory 405 is set into a write mode, and addresses 3, 2, 1 and 0 are supplied from address generator 403 to memory 405. Pieces of data, 1, 2, 3 and 4, are thus sequentially read from RAM 404 and then sequentially input to adder 407 through multiplexer/register circuit 406. Pieces of input digital data, 5, 6, 7 and 8 are sequentially written into memory 405 which has been accessed by addresses 3, 2, 1 and 0. When the pieces of input data, 5, 6, 7 and 8 are written into memory 405, signals A-R/W and B-R/W are inverted. Hence, pieces of data, 9, 10, 11 and 12 are sequentially written into RAM 404, the pieces of data, 5, 6, 7 and 8 are read from RAM 405 and output via multiplexer/register circuit 406. As a result, the pieces of input data, 1 to 8, are output from circuit 406, being delayed by the time corresponding to the first four clock signals CLK. Then, signals A-R/W and B-R/W are inverted again. At this time, the pulse widths of both control signals A-R/W and B-R/W are increased in order to achieve dynamic focussing of the ultrasonic beam. Namely, as is shown in FIG. 4, both the data-reading period and the data-writing period are changed to a period defined by six clock signals CLK. Addresses 3, 2, 1, 0, 1 and 0 are thus supplied to memory 404. That is, addresses 1 and 0 are designated twice. This is because six pieces of data must be read, though only four pieces of data have been stored in memory 404. Then, the pieces of input digital data, 9, 10, 11, 12, 11 and 12 are read out from memory 404. In the meantime, addresses 5, 4, 3, 2, 1 and 0 are designated by the address data supplied from address generator 403. Hence, six pieces of input data, 13 to 18, are written into memory 405. Thereafter, signals A-R/W and B-R/W are inverted, and memories 404 and 405 are set into the write mode and read mode, respectively. As a result, pieces of input data, 19 to 24, are written into memory 404, and pieces of input data, 13 to 18 are read out from memory 405.

The operation described in the preceding paragraph is repeated, thereby repeatedly changing the pulse widths of read/write control signals A-R/W and B-R/W, and thus accomplishing dynamic focussing of the ultrasonic beam.

In each delay unit, as has been described, two RAMs 404 and 405 are alternately set into the read mode and the write mode. Further, the number of addresses of either RAM, which are designated for reading or writing the data for every channel, is changed to vary the delay time of the unit to the value suitable to the point where the ultrasonic beam is focused and also to the direction of the echo wave from the subject to be scanned.

The operation of the ultrasonic imaging apparatus of FIG. 1, which is provided with the digital delay units DU1 to DUn, will be explained. Under the control of controller 16, scan control circuit 15 sets delay time data in delay time-setting circuit 13. The delay time data represents the time which is required to perform a sector scanning by focussing an ultrasonic beam. Circuit 13 sets a delay time in transmission delay circuit 12. This delay time corresponds to the beam-transmission direction for each channel. In other words, the delay time changes according to the channel. Hence, transmission delay circuit 12 outputs drive pulses for the delay time determined by the output signals of delay time-setting circuit 13 and reference signal generator 14. These drive pulses are supplied to ultrasonic transducer 11. These pulses drive those transducer elements of transducer 11, whereby transducer 11 emits an ultrasonic beam in the direction of the subject to be scanned.

The echo waves emanated from the subject are detected by ultrasonic transducer 11. The transducer elements for the first to nth channels convert these echo waves into echo signals. The echo signals are amplified by preamplifier circuit 17 and then input to delay units DU1 to DUn of reception delay circuit 18. The echo signal input to each delay unit is converted into a digital signal. The addresses, the number of which has been set by delay time-setting circuit 13 and corresponds to the reception delay time, are supplied to RAMs 404 and 405 of each delay unit. Thus, the digital echo signal is delayed by the data-reading operation and data-writing operation of RAMs 404 and 405. As a result, the output signals of delay units DU1 to DUn are phased echo signals. The phased echo signals are added by adder ADD. The output of adder ADD, i.e., the sum of the phased echo signals, is supplied to detector circuit 19 and is detected. The detected echo signal is processed by signal-processing circuit 20. The output signal of circuit 20 is written into digital scan converter 21.

When ultrasonic transducer 11 receives echo waves from the dynamic focal points within the subject, delay time-setting circuit 13 sets the reception delay times, which correspond to these dynamic focal points, in delay units DU1 to DUn, respectively. Consequently, the number of addresses for the channel corresponding to each dynamic focal point is updated by the reception delay time. This address-updating enables reception delay circuit 18 to output the sum of the phased echo signals, i.e., the echo components which have emanated from the dynamic focal point.

Figure 5:
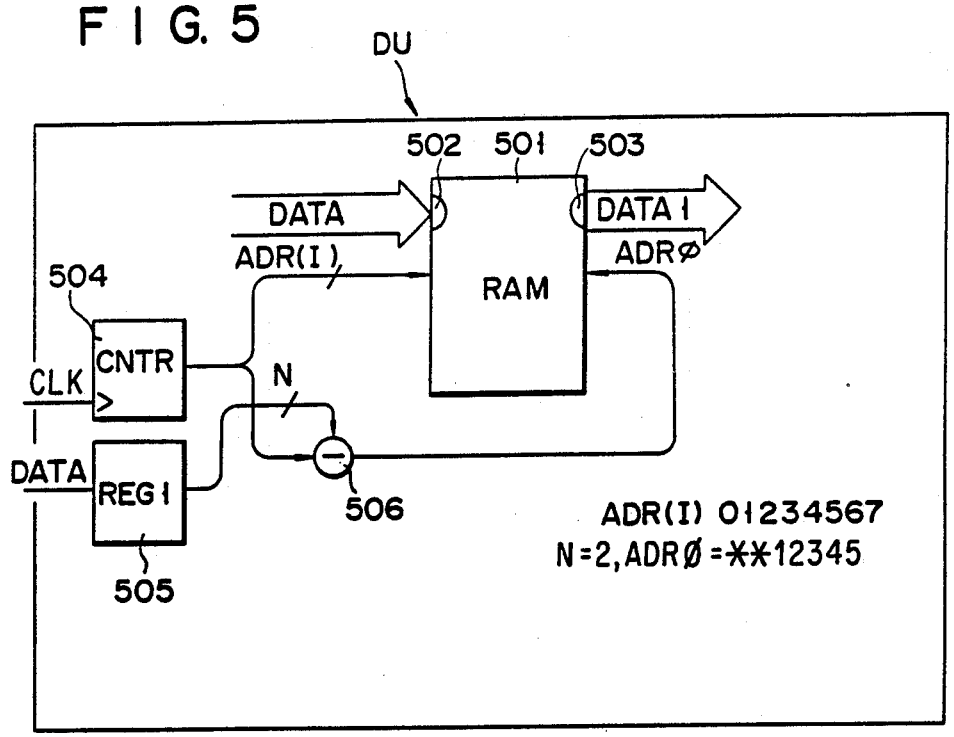
FIG. 5 is a block diagram of the digital delay circuit used in another ultrasonic imaging apparatus according to the invention.

FIG. 5 shows a modification of delay unit DU illustrated in FIG. 3. This delay unit comprises one RAM 501, at least one input port 502, and at least one output port 503. RAM 501 has a write-address terminal ADR(I) and a read-address terminal ADR$\phi$, and can read and write data at the same time. Counter 504 is coupled to terminals ADR(I) and ADR$\phi$. Counter 504 determines the number of read-addresses and the number of write-addresses, in accordance with the delay time data read out from delay time-setting circuit 13.

Delay unit DU of FIG. 5 further comprises register 505 and subtracter 506. Any desired delay time is set in register 505. Register 505 is coupled to subtracter 506. Subtracter 506 takes delay value N from address ADR(I) output from counter 504, thereby obtaining new address ADR$\phi$. Delay value N has been supplied from register 505 and represents the number of clock signals CLK. For instance, when N=2, the delay time defined by two clock signals is set, and when N=4, a longer delay time defined by four clock signals is set. The address ADR(I) supplied to input port 502 of RAM 501 is incremented by one every time counter 504 outputs one signal. Hence, the address ADR$\phi$ output from output port 503 of RAM 501 has the value of (I−N). More specifically, when N=2, addresses ADR(I) and ADR$\phi$ assume the values shown in FIG. 5, as clock signals are supplied to counter 504. That is, output address ADR$\phi$ of RAM 501 is delayed by two units of clock time cycles with respect to input address ADR(I). The delay time $R_R$ of delay unit DU shown in FIG. 5 can take any desired value, as will be evident from the following equation:

$T_R = N/\tau_{ck}$ ($\tau_{ck}$: the cycle of the clock signal)

Figure 6:
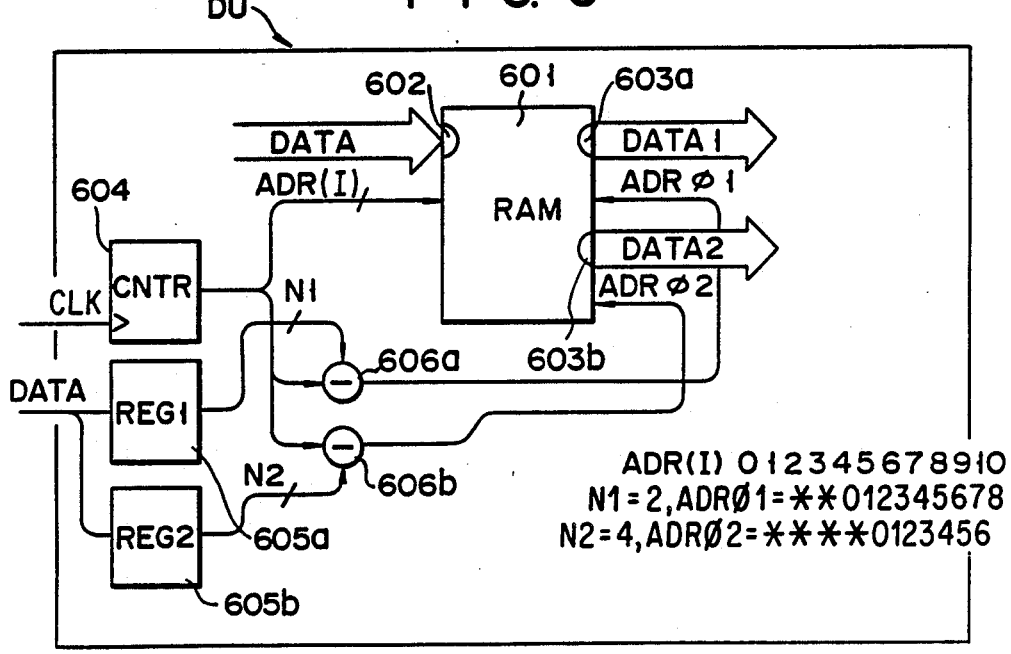
FIG. 6 is a block diagram of the digital delay circuit used in a further ultrasonic imaging apparatus according to the invention.

FIG. 6 shows another modification of delay unit DU illustrated in FIG. 3. As is shown in FIG. 6, this delay unit DU comprises three-port RAM 601 having one input port 602 and two output ports 603a and 603b. (A three-port RAM of this type if disclosed in CMOS Gate Array with RAMs, Toshiba Review, Vol. 40, No. 6, 1985.) The delay unit further comprises two registers 605a and 605b for storing delay time N1 and delay time N2, respectively, and two subtracters 606a and 606b coupled to registers 605a and 605b, respectively. Address ADR$\phi$1 of value (I=N1) and address ADR$\phi$2 of value (I=N2) are supplied to output ports 603a and 603b, respectively. When N2=4, addresses ADR (I), ADR $\phi$1 and ADR $\phi$2 will have the values shown in FIG. 6. That is, address ADR $\phi$1 is generated upon lapse of two units of clock time cycles after write-address ADR (I) has been produced, and address ADR $\phi$2 is generated upon lapse of four units of clock time cycles after write-address ADR (I) has been produced.

Figure 7:
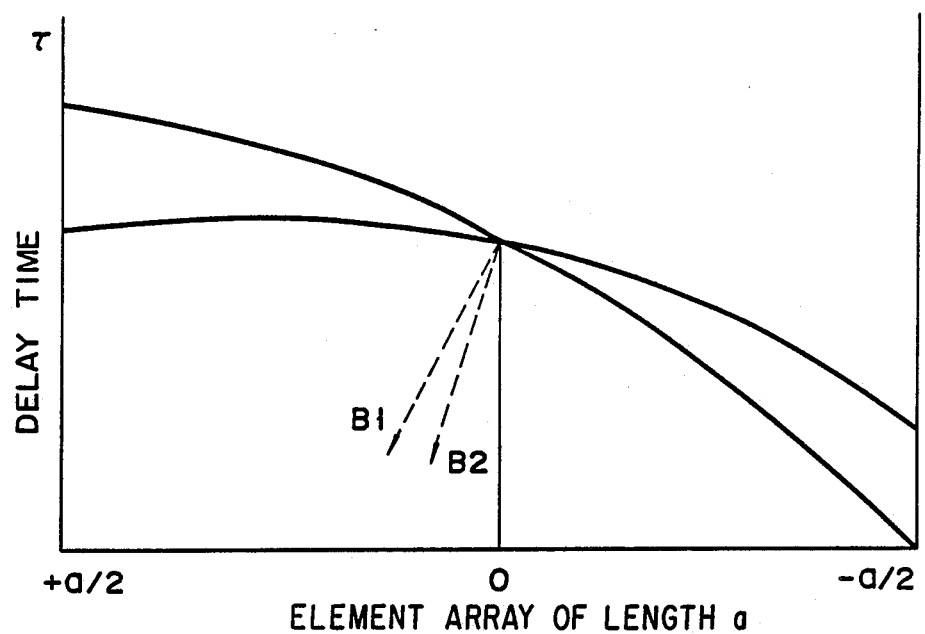
FIG. 7 is a graph illustrating the relationship between an array of ultrasonic elements and the delay time defined by the delay circuit shown in FIG. 5 or 6.

When delay units identical to unit DU shown in FIG. 6 are used in reception delay circuit 18 (FIG. 1), two pieces of echo data, which correspond to two echo waves, can be obtained from one echo wave emanating from a point where one ultrasonic beam has been applied. This generation of two pieces of echo data is equivalent to a simultaneous reception of two echo waves, and will be explained with reference to FIG. 7. When an echo wave resulting from one ultrasonic beam applied to the subject reaches ultrasonic transducer 11, it is converted into an echo signal. The echo signal is written as echo data into three-port RAM 601 when a clock signal is supplied to RAM 601. The echo data is processed according to delay values N1 and N2, thereby providing two pieces of echo data ECH1 and ECH2 (not shown). These pieces of echo data are simultaneously read out from RAM 601. Echo data ECH1 and echo data ECH2 correspond to echo beams B1 and B2, both shown in FIG. 7. These echo beams B1 and B2 correspond to the ultrasonic beam applied to the subject. This means that reception delay circuit 18 provides two pieces of echo data corresponding to two echo beams emanating from the same point within the subject to transducer 11 in two different directions. Since circuit 18 can provide a greater amount of data than the case where one piece of echo data is produced from each echo beam, the ultrasonic imaging apparatus of the present invention can form a tomogram of high resolution.

Figure 8:
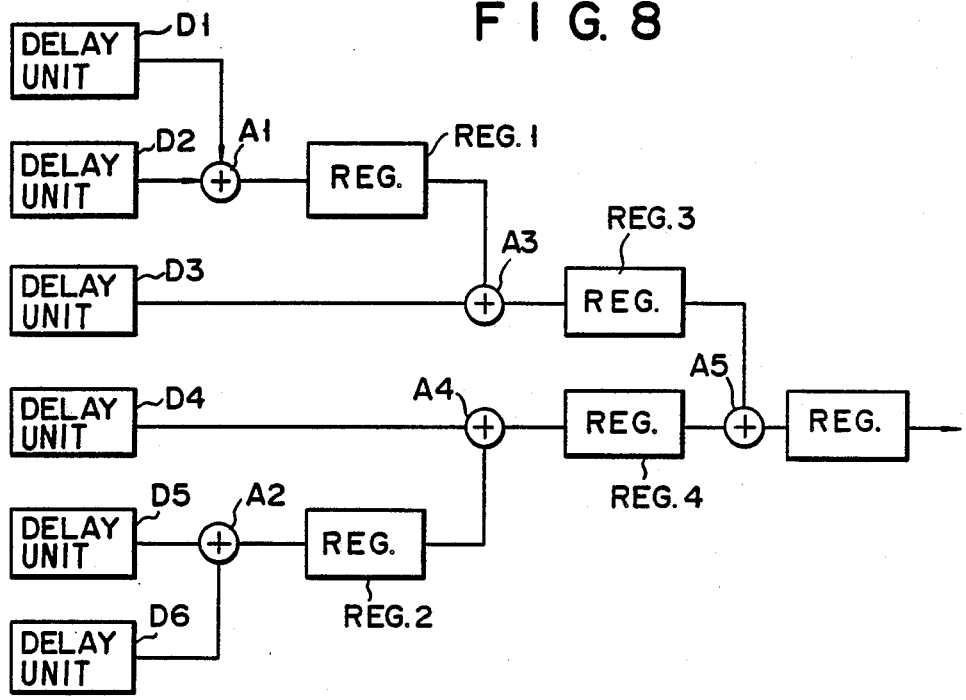
FIG. 8 is a block diagram of the delay circuit section employed in still another ultrasonic imaging apparatus according to the present invention.

In the embodiment described above, the delay units of each set each have their output connected to the input of the next-stage delay unit, as is illustrated in FIG. 2. This cascade connection can be replaced by the specific connection shown in FIG. 8, wherein two delay units D1 and D2, provided for the first and second channels, respectively, are coupled to adder A1, and two other delay circuits D5 and D6, provided for the fifth and sixth channels, are connected to adder A2. The outputs of adders A1 and A2 are coupled to registers REG1 and REG2, respectively. The output of register REG1 and the output of delay unit D3, provided for the third channel, are coupled to adder A3. The output of register REG2 and the output of delay unit D4, provided for the fourth channel, are coupled to adder A4. The outputs of adders A3 and A4 are coupled to registers REG3 and REG4, respectively. The outputs of registers REG3 and REG4 are connected to adder A5. The circuit of FIG. 8 can add the phased echo signals at a higher speed than the circuit shown in FIG. 2.

In the circuit of FIG. 2, delay units DU1 and DUn are divided into four groups. Instead, the delay units for all of the channels can be connected in cascade, so that the delay signals of these channels are sequentially added in one large group. In this case, the adder ADD of FIG. 2 can be dispensed with.

What is claimed is:

1. An ultrasonic imaging apparatus, comprising:
   ultrasonic transducer means for emitting ultrasonic beams, receiving echo waves, and outputting echo signals, including an array of ultrasonic transducer elements corresponding to each of a plurality of channels divided into a predetermined number of channel groups;
   reception delay circuit means for delaying the echo signals by a delay time, including a plurality of delay units coupled to corresponding ultrasonic transducer elements and divided into a plurality of delay unit groups corresponding to the channel groups;
   signal processing means for processing the delayed echo signals and outputting image signals; and
   display means for displaying the image signals in the form of a tomogram, wherein:
   each delay unit group includes a first delay unit, a last delay unit, and any number of additional delay units, all of the delay units in each delay unit group being sequentially connected in a cascade configuration and having means for outputting a delayed output signal,
   each of the delay units includes memory means for writing in and reading out the echo signals,
   the echo signals read out of the memory means of the first delay units of each delay unit group are the delayed output signals of the first delay units,
   the additional and the last delay units of each delay unit group include first adding means for adding a delayed output signal of a delay unit to the echo signals read out of the memory means of a sequentially connected delay unit and for outputting an additive output, wherein the additive output is the delayed output signal of the sequentially connected delay unit,
   the delay units include addressing means for addressing the memory means by a number of addresses that corresponds to the delay time, and
   the reception delay circuit means further includes second adding means for adding the delayed output signals of the last delay units in each of the delay unit groups and outputting delayed echo signals.

2. The ultrasonic imaging apparatus of claim 1, further comprising reception delay time-setting means for setting the delay time necessary to achieve focussing and outputting a time delay signal.

3. The ultrasonic imaging apparatus of claim 2, wherein the memory means further comprises:
   input means for inputting the echo signals from the corresponding transducer elements to the memory means;
   address receiving means for receiving the addresses designated by the addressing means;
   storing means for storing the echo signals input through the input means in separate storage locations designated by the addressing means; and
   output means for outputting the echo signals stored in the storage locations.

4. The ultrasonic imaging apparatus of claim 3, wherein:
   memory means includes first and second memory means for alternately reading and writing echo signals;
   the delay units include first register means for storing and outputting the delayed output signal;
   the input means inputs echo signals when the memory means is supplied with a write signal; and
   the output means outputs the echo signals when the memory means is supplied with a read signal.

5. The ultrasonic imaging apparatus of claim 4, further comprising read/write means for supplying the write signal to the first memory means while supplying the read signal to the second memory means, and for supplying the read signal to the first memory means while supplying the write signal to the second memory means, wherein the supplied signals correspond in time length to the time delay signal.

6. The ultrasonic imaging apparatus of claim 5, wherein the number of addresses corresponds to the length of the signal supplied to the memory means by the read/write means.

7. The ultrasonic imaging apparatus of claim 3, wherein:
   the memory means includes third memory means for simultaneously reading and writing echo signals;
   the address receiving means includes a write address receiving means for receiving a write address and a first read address receiving means for receiving a first read address;
   the addressing means includes:
      counting means, responsive to the time delay signal, for determining the number of addresses and addressing the write address receiving means,
      second register means for receiving, storing, and outputting a first delay value, and
      first subtracter means for subtracting the first delay value from the number of addresses and addressing the first read address receiving means;
   the input means inputs echo signals when the write address receiving means is addressed; and
   the output means outputs echo signals when the read address receiving means is addressed.

8. The ultrasonic imaging apparatus of claim 7, wherein:
   the address receiving means further includes a second read address receiving means for receiving a second read address;
   the addressing means further includes:
      third register means for receiving, storing, and outputting a second delay value, and
      second subtracter means for subtracting the second delay value from the number of addresses and addressing the second read address receiving means;

the output means includes a first and second output means, corresponding to the first and second read address receiving means, for simultaneously outputting echo signals.

9. An ultrasonic imaging apparatus, comprising:
ultrasonic transducer means for emitting ultrasonic beams, receiving echo waves, and outputting echo signals, including an array of ultrasonic transducer elements corresponding to each of a plurality of channels divided into a predetermined number of channel groups;
reception delay circuit means for delaying the echo signals by a delay time, including a plurality of delay units coupled to corresponding ultrasonic transducer elements and divided into a plurality of delay unit groups corresponding to the channel groups;
signal processing means for processing the delayed echo signals and outputting image signals; and
display means for displaying the image signal in the form of a tomogram;
wherein, each of the delay units includes:
    memory means for writing in and reading out the echo signal;
    addressing means for addressing the memory means by a number of addresses that corresponds to the delay time, and
    means for outputting the echo signals read out of the memory means as a delayed output signal;
the reception delay circuit means further includes:
    a plurality of first adding means for adding the delayed output signals of two delay units and outputting a plurality of first adder outputs,
    a plurality of second adding means for adding the delayed output signals of a delay unit whose delayed output signal was not added in the first adding means to a first adder output and outputting a plurality of second adder outputs,
    third adding means for adding the plurality of second adder outputs and outputting delayed echo signals.

10. The ultrasonic imaging apparatus of claim 9, further comprising reception delay time-setting means for setting the delay time necessary to achieve focussing.

* * * * *

UNITED STATES PATENT AND TRADEMARK OFFICE
CERTIFICATE OF CORRECTION

PATENT NO. : 4,959,998

DATED : October 2, 1990

INVENTOR(S) : Masahiko Yano

Page 1 of 2

It is certified that error appears in the above-identified patent and that said Letters Patent is hereby corrected as shown below:

Title Page, item [63] Related U.S. Application Data, after "abandoned" insert --which is a continuation of Ser. No. 036,474, Apr. 9, 1987, abandoned--;

Column 3, Line 6, change "And" to --$AD_n$--;

Column 3, Line 9, change "And" to --$AD_n$;

Column 3, Line 11, change "And" to --$AD_n$--;

Column 3, Line 13, change "groupsof" to --groups of--;

Column 4, Line 30, begin a new paragraph at "Then";

Column 6, Line 68, change "circuits" to --units--;

Claim 4, Column 8, Line 15, before "memory" insert --the-- (first occurrence);

UNITED STATES PATENT AND TRADEMARK OFFICE
CERTIFICATE OF CORRECTION

PATENT NO. : 4,959,998

DATED : October 2, 1990

INVENTOR(S) : Masahiko Yano

It is certified that error appears in the above-identified patent and that said Letters Patent is hereby corrected as shown below:

Claim 9, Column 10, Line 2, change "signal:" to --signals,--.

Signed and Sealed this

Fifth Day of January, 1993

Attest:

DOUGLAS B. COMER

*Attesting Officer*    Acting Commissioner of Patents and Trademarks